US009930507B2

(12) United States Patent  
Malik et al.

(10) Patent No.: US 9,930,507 B2  
(45) Date of Patent: Mar. 27, 2018

(54) MANAGING EMERGENCY COMMUNICATION SESSION TERMINATION

(71) Applicant: QUALCOMM Incorporated, San Diego, CA (US)

(72) Inventors: Ashish Malik, San Diego, CA (US); Ankit Baphna, San Diego, CA (US); Prashant Soman, San Diego, CA (US); Gautham Datta Mayyuri, San Diego, CA (US); Preeti Syal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/640,173

(22) Filed: Mar. 6, 2015

(65) Prior Publication Data

US 2016/0261996 A1    Sep. 8, 2016

(51) Int. Cl.  
*H04W 4/22* (2009.01)

(52) U.S. Cl.  
CPC .................... *H04W 4/22* (2013.01)

(58) Field of Classification Search  
CPC ..... H04W 76/007; H04W 4/22; H04M 11/04; H04M 2242/04; G08B 25/016  
See application file for complete search history.

(56) References Cited

U.S. PATENT DOCUMENTS

| 6,334,054 | B1  | 12/2001 | Link, II et al. |
| 7,643,625 | B2* | 1/2010  | Pearson ................. H04M 11/04 379/196 |
| 8,744,497 | B2  | 6/2014  | Liu |
| 2006/0046727 | A1 | 3/2006 | Sanders et al. |
| 2009/0113300 | A1 | 4/2009 | Tuli |
| 2011/0294548 | A1* | 12/2011 | Jheng .................. H04L 12/1818 455/558 |
| 2012/0171983 | A1* | 7/2012 | Eitel ...................... H04M 11/04 455/404.1 |
| 2013/0244608 | A1 | 9/2013 | Malik et al. |
| 2014/0106699 | A1 | 4/2014 | Chitre et al. |

FOREIGN PATENT DOCUMENTS

EP    2472839 A1    7/2012

OTHER PUBLICATIONS

International Search Report and Written Opinion—PCT/US2016/013166 ISA/EPO—dated May 3, 2016.

\* cited by examiner

*Primary Examiner* — Ted Wang  
(74) *Attorney, Agent, or Firm* — The Marbury Law Group, PLLC (57) ABSTRACT

Systems, methods, and devices for managing termination of an active communication session in a wireless communication device. A processor of the wireless communication device may receive an instruction to terminate a communication session. The processor may determine whether an emergency communication status of the wireless communication device indicates that the communication session should not be terminated. The processor may block the instruction to terminate the communication session in response to determining that the emergency communication status indicates that the communication session comprises an emergency communication session.

27 Claims, 8 Drawing Sheets

MANAGING EMERGENCY COMMUNICATION SESSION TERMINATION

BACKGROUND

Wireless communication devices may be used to place an emergency call, for example to a public safety answering point (PSAP) or to an emergency services responder (e.g., police or fire department). Due to the nature of emergency calls, it is vitally important that the wireless communication device remain powered on and able to provide communication services. However, an emergency call may be unintentionally terminated, or the wireless communication device may unintentionally be powered off by, for example, a buggy application or malfunctioning hardware. It is thus vitally important to prevent a wireless communication device from being unintentionally powered off or an emergency call from being unintentionally terminated.

SUMMARY

Systems, methods, and devices of various embodiments enable a wireless communication device to manage termination of an active communication session to prevent certain important sessions from being terminated. Various embodiments may include receiving an instruction to terminate a communication session, determining whether a communication session is in progress that should not be terminated, and blocking the instruction to terminate the communication session in response to determining that an emergency communication status indicates that the communication session includes an emergency communication session. Some embodiments may further include determining whether an emergency communication is in process, and storing an emergency communication status indicating that the communication session should not be terminated in response to determining that an emergency communication session is in process, wherein determining whether a communication session is in progress that should not be terminated may include determining whether an emergency communication status of the wireless communication device indicates that the communication session should not be terminated.

Some embodiments may further include determining when the communication session has ended, and updating the emergency communication status in the memory. Some embodiments may further include permitting the instruction to terminate the communication session in response to determining that the emergency communication status of the wireless device indicates that the communication session may be terminated. In some embodiments, the instruction to terminate the communication session may include an instruction to power down the wireless communication device. In some embodiments, blocking the instruction to terminate the communication session may include blocking the instruction to power down the wireless communication device.

Some embodiments may further include updating the emergency communication status in memory in response to the communication session ending, determining whether the instruction to terminate the communication session is still valid, continuing normal operations of the wireless communication device in response to determining that the instruction to power down the wireless communication device is not still valid, and permitting the instruction to power down the wireless communication device in response to determining that the instruction to power down the wireless communication device is still valid. In some embodiments, the instruction to terminate the communication session may include an instruction to deactivate a radio of the wireless communication device. In some embodiments, blocking the instruction to terminate the communication session may include blocking the instruction to deactivate the radio of the wireless communication device.

Some embodiments may further include updating the emergency communication status in the memory in response to the communication session ending, determining whether the instruction to deactivate the radio is still valid, continuing normal operations of the wireless communication device in response to determining that the instruction to deactivate the radio is not still valid, and permitting the instruction to deactivate the radio of the wireless communication device in response to determining that the instruction to deactivate the radio is still valid.

Various embodiments may include a wireless communication device including a processor configured with processor-executable instructions to perform operations of the embodiment methods described above. Various embodiments may include a non-transitory processor-readable storage medium having stored thereon processor-executable software instructions configured to cause a processor to perform operations of the embodiment methods described above. Various embodiments may include a wireless communication device that includes means for performing functions of the operations of the embodiment methods described above.

BRIEF DESCRIPTION OF THE DRAWINGS

The accompanying drawings, which are incorporated herein and constitute part of this specification, illustrate exemplary embodiments. Together with the general description given above and the detailed description given below, the drawings serve to explain features of the various embodiments, and not to limit the various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The word "exemplary" is used herein to mean "serving as an example, instance, or illustration." Any implementation described herein as "exemplary" is not necessarily to be construed as preferred or advantageous over other implementations.

The terms "communication device" and "wireless communication device" are used interchangeably herein to refer generally to any one or all of cellular telephones, smart phones, tablet computers, Internet enabled cellular telephones, Wi-Fi enabled electronic devices, personal data assistants (PDAs), laptop computers, personal computers, wireless accessory devices, wireless peripheral devices, and similar electronic devices equipped with a short-range radio (e.g., a Bluetooth® radio, a Peanut® radio, a Wi-Fi radio, etc.) and/or a wide area network connection (e.g., an LTE, 3G, 4G, or 5G wireless wide area network transceiver or a wired connection to the Internet). Thus, reference to a particular type of computing device as being a communication device or a mobile communication device is not intended to limit the scope of the claims unless a particular type of mobile device or mobile communication device is specifically recited.

Different cellular and mobile communication services and standards are available or contemplated in the future, all of which may implement and benefit from the various embodiments. Such services and standards include, e.g., Third Generation Partnership Project (3GPP) Long Term Evolution (LTE) systems, third generation wireless mobile communication technology (3G), fourth generation wireless mobile communication technology (4G), fifth generation wireless mobile communication technology (5G), Global System For Mobile Communications (GSM), Universal Mobile Telecommunications System (UMTS), 3GSM, General Packet Radio Service (GPRS), Code Division Multiple Access (CDMA) systems (e.g., cdmaOne), Enhanced Data Rates for GSM evolution (EDGE), Advanced Mobile Phone System (AMPS), digital AMPS (IS-136/TDMA), Evolution-Data Optimized (EV-DO), Digital Enhanced Cordless Telecommunications (DECT), Worldwide Interoperability for Microwave Access (WiMAX), Wireless Local Area Network (WLAN), Wi-Fi Protected Access I & II (WPA, WPA2), and Integrated Digital Enhanced Network (iDEN). Each of these technologies involves, for example, the transmission and reception of voice, data, signaling, and/or content messages. Any references to terminology and/or technical details related to an individual telecommunication standard or technology are for illustrative purposes only, and are not intended to limit the scope of the claims to a particular communication system or technology unless specifically recited in the claim language.

The various embodiments provide methods and communication systems to enable a wireless communication device to manage whether an active emergency communication session is terminated. Typical wireless communication devices may be used to place an emergency call, for example to a PSAP or to another emergency services provider or first responder. In the event of an emergency call, it is of great importance that the wireless communication device remain powered on and able to provide emergency communication services. However, there could be circumstances in which an emergency call may be unintentionally terminated or the device powered down against the will of the user. For example, a wireless communication device's "airplane mode" may be unintentionally triggered by, for example, malfunctioning hardware or by a fault in an application running on the wireless communication device. Placing a wireless communication device in airplane mode powers off or otherwise prevents access to a radio of the wireless communication device. Powering down the radio will terminate any active communication session. As another example, a wireless communication device may be unintentionally powered off by, for example, due to an operator mistake, jostling of the device, or a fault in hardware or software of the wireless communication device. Given the possible consequences from unintentionally terminating an emergency communication session, it is thus beneficial to prevent a mobile communication device (or its radio) from being unintentionally powered off or placed in an operating mode that will terminate an emergency call.

Various embodiments provide methods implemented by a processor executing on a wireless communication device to manage termination of an active communication session in a wireless communication device to avoid terminating an ongoing emergence communication session. In various embodiments, a processor of the wireless communication device may receive an instruction that will terminate an active communication session, such as a user input to power down or place the device in airplane mode. The processor of the wireless communication device may determine whether an emergency communication is underway, which may indicate that the communication session should not be terminated. The processor of the wireless device may block the instruction to terminate the active communication session in response to determining that an active emergency communication session is underway. Once that emergency communication session ends, the wireless communication device may return to a normal mode or execute the previously entered user input power down or deactivate the radio.

Figure 1:
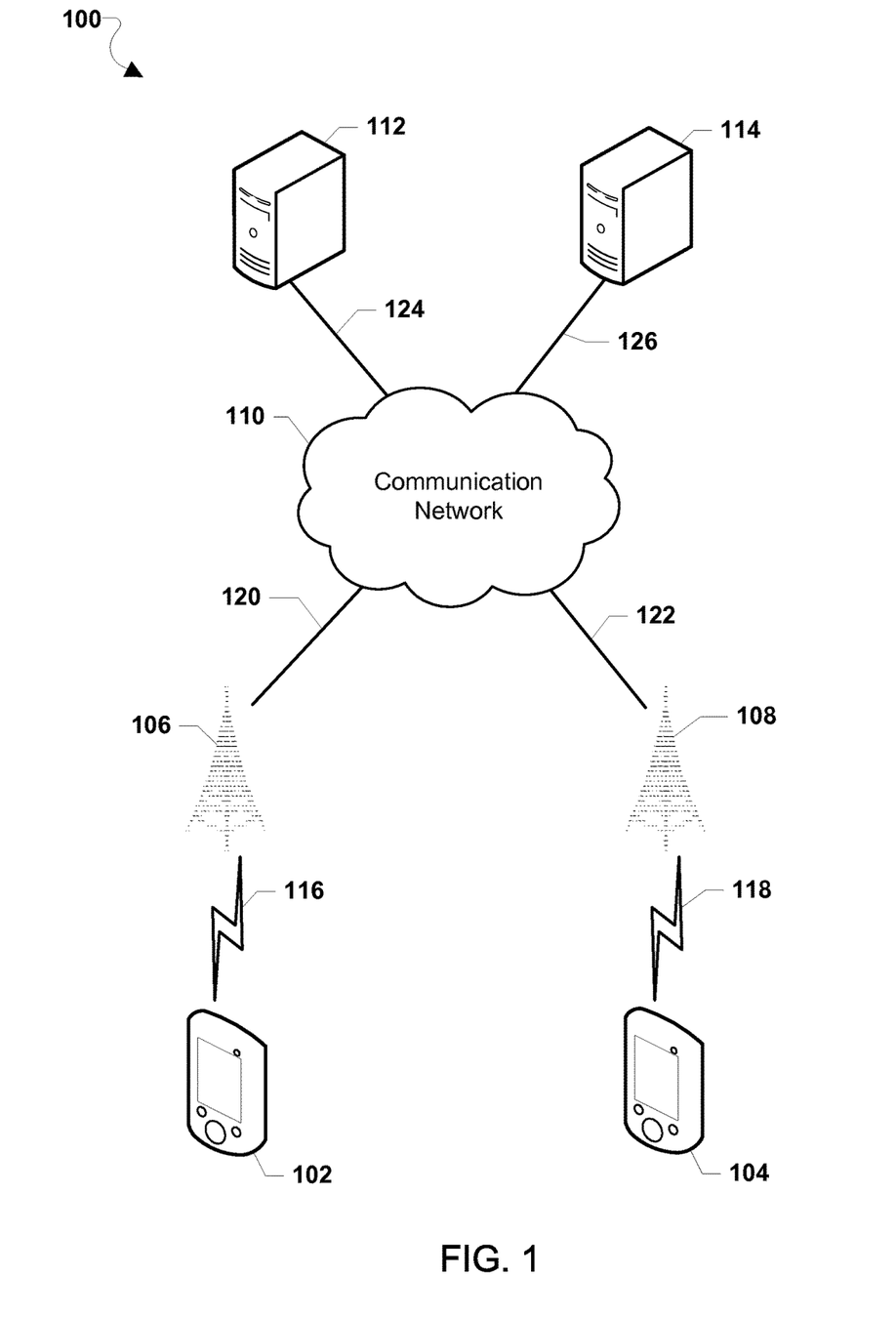
FIG. 1 is a component block diagram illustrating a communication system suitable for use with the various embodiments.

FIG. 1 illustrates a system 100 suitable for use with the various embodiments. The system 100 may include wireless communication devices 102 and 104, base stations 106 and 108, a communication network 110, a controller node 112, and a PSAP 114.

Wireless communication devices 102 and 104 may communicate with the communication network 110 via the base stations 106 and 108, respectively, over communication links 116 and 118, respectively. The communication links 116 and 118 may include cellular connections that may be made through two-way wireless communication links using a wireless radio access technology (RAT) such as LTE, WiMAX, CDMA, TDMA, Wideband CDMA, GSM, and other mobile telephony communication technologies. A communication link may include one or more frequency bands, and a frequency band may include one or more logical channels. While the communication links 116 and 118 are illustrated as single links, in some embodiments the mobile communication devices may communicate with their respective base stations using two or more RATs over two or more frequency bands.

The base stations 106 and 108 may communicate with the communication network 110 over wired and/or wireless communication links 120 and 122. Each of the base stations 106 and 108 may include a network node capable of providing wireless communications to the mobile communication devices 102 and 104, and may include a base transceiver station, a radio base station, an eNodeB device, or an enhanced eNodeB device. The communication links 120 and 122 may include wired or wireless communication links such as fiber optic backhaul links, microwave backhaul links, and other similar communication links.

The controller node 112 may communicate with the communication network 110 over a communication link 124. The controller node 112 may control the setup and maintenance of a communication session over the communication network 110, such as between a wireless communication device 102 or 104 and the PSAP 114, or among communication devices such as the wireless communication devices 102 and 104. The controller node 112 may include a mobile switching center (MSC), a mobility management entity (MME), or another similar network node. For dispatch communications, the controller node 112 may utilize a dispatch communications protocol such as iDEN (Integrated Digital Enhanced Network), or QChat.

The PSAP 114 may communicate with the communication network 110 over a communication link 126. The PSAP 114 may include a server or other network element that may be configured to provide emergency communication services. Examples of the PSAP 114 may include an emergency services answering point (e.g., 911 services in the U.S.), a police department or dispatcher, a fire department or dispatcher, or another provider of emergency services or first responder services.

Figure 2:
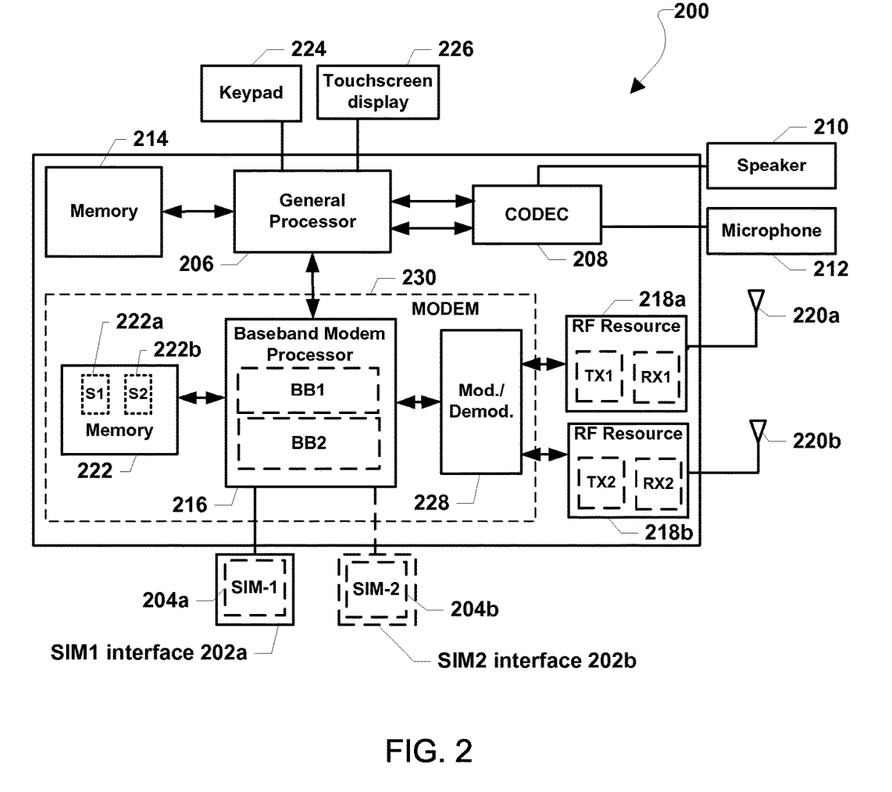
FIG. 2 is a component block diagram of a wireless communication device according to various embodiments.

FIG. 2 is a component block diagram of a wireless communication device 200 suitable for implementing various embodiments. In various embodiments, the wireless communication device 200 may be similar to the wireless communication devices 102 and 104 as described with reference to FIG. 1. With reference to FIGS. 1 and 2, the wireless communication device 200 may include a first SIM interface 202a, which may receive a first identity module SIM-1 204a that is associated with a first subscription. The wireless communication device 200 may optionally also include a second SIM interface 202b, which may receive a second identity module SIM-2 204b that is associated with a second subscription.

A SIM in various embodiments may be a Universal Integrated Circuit Card (UICC) that is configured with SIM and/or USIM (Universal Subscriber Identity Module) applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The wireless communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to one or more RF resources 218a, 218b for transmission. The modulator/demodulator 228 may also extract an information-bearing signal from a modulated carrier wave received from the one or more RF resources 218a, 218b, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the wireless communication device 200 (e.g., SIM-1 204a, SIM-2 204b) may be coupled to the modem 230 and may be associated with or permitted to use a baseband-RF resource chain. Each baseband-RF resource chain may include the baseband modem processor 216 to perform baseband/modem functions for communicating with/controlling a RAT, and one or more amplifiers and radios, referred to generally herein as RF resources. In some embodiments, baseband-RF resource chains may share a common baseband modem processor 216 (i.e., a single device that performs baseband/modem functions for all RATs on the wireless communication device). Alternatively, each baseband-RF resource chain may include the physically or logically separate baseband processors (e.g., BB1, BB2).

The RF resources 218a, 218b may include transceivers associated with one or more RATs and may perform transmit/receive functions for the mobile communication device 200 on behalf of their respective RATs. The RF resources 218a, 218b may include separate transmit and receive circuitry. In some embodiments, the RF resource 218b may include only receive circuitry. The RF resources 218a, 218b may each be coupled to a wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and the RF resources 218a, 218b may be included in the wireless communication device 200 as a system-on-chip. In some embodiments, the first and second SIMs 204a, 204b and their corresponding interfaces 202a, 202b may be external to the system-on-chip. Further, various input and output devices may be coupled to components on the system-onchip, such as interfaces or controllers. Example user input components suitable for use in the mobile communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the wireless communication device 200 to enable communication between them.

Functioning together, the two SIMs 204a, 204b, the baseband processor(s) 216, RF resources 218a, 218b and the antennas 220a, 220b may enable communications on two or more RATs. For example, one SIM, baseband processor, and RF resource may be configured to support two different RATs. In other embodiments, more RATs may be supported on the wireless communication device 200 by adding more SIM cards, SIM interfaces, RF resources, and antennas for connecting to additional mobile networks.

The wireless communication device 200 may include a radio interface layer (RIL), which may be a component of a high-level operating system (HLOS) or other software executing on a processor, such as the general processor 206, the baseband processor 216, or another processor of the wireless communication device. The RIL may enable wireless voice or data applications to communicate with the modem 230, and may further provide a system interface between a HLOS and a radio protocol stack (e.g., S1 222a and S2 222b). In some embodiments, the RIL may include a RIL driver, which may processes attention (AT) commands and events, and a RIL proxy, which may manage requests from the multiple clients to the RIL driver. For example, the RIL driver may handle system requests for radio functionality, including voice, data, and Short Message Service (SMS). The RIL driver may also provide notifications of changes in a radio state, such as signal coverage, signal strength, and incoming calls. Interactions between the HLOS and the modem 230 may be handled by the RIL. For example, the RIL may accept and convert direct service requests from the HLOS into commands supported and understood by the modem. In some embodiments, the RIL may provide an abstraction layer that abstracts specific details of hardware dependent components of the wireless communication device 200.

Figure 3:
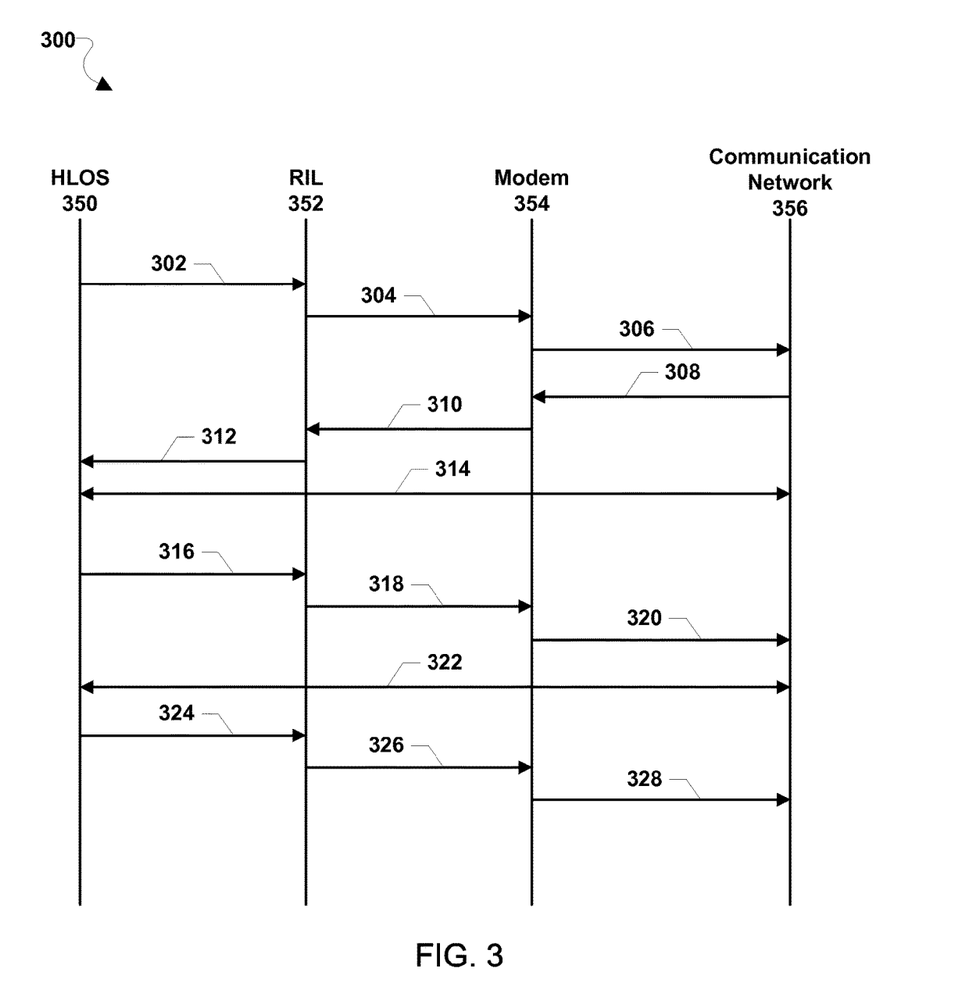
FIG. 3 is a call flow diagram illustrating conventional termination of an emergency communication session.

FIG. 3 illustrates call flows during a conventional termination of an emergency communication session. In operation 302, a high-level operating system (HLOS) 350 may send to a radio interface layer (RIL) 352 an instruction to initiate an emergency communication session. For example, a wireless communication device (e.g., the wireless communication device 102 or 104 of FIG. 1, or the wireless communication device 200 of FIG. 2) may receive an input, such as the digits 9-1-1, or the depression of a virtual or physical "panic button," in response to which the HLOS 350 may send to the RIL 352 the instruction to initiate an emergency communication session. In operation 304, the RIL 352 may send to a modem 354 of the wireless communication device an instruction to initiate emergency communication session. In operation 306, the modem 354 may send to a communication network 356 (e.g., the communication network 110 of FIG. 1) call request to establish the emergency communication session. A network element of the communication network 356, such as a controller node (e.g., the controller node 112 of FIG. 1) may allocate resources for and establish a communication session with a provider of emergency services (e.g., the PSAP 114 of FIG. 1).

In operation 308, the communication network 356 may send to the modem 354 an indication that the communication session setup was successful. In operation 310, the modem 354 may send to the RIL 352 an indication that the communication session set up was successful, and in operation 312, the RIL 352 may send to the HLOS 350 an indication that the communication setup was successful. In operation 314, the wireless communication device may conduct the emergency communication session via the communication network 356.

In operation 316, the HLOS may send to the RIL an instruction to terminate the active emergency communication session. The instruction to terminate the active communication session may result from, for example, the wireless communication device being placed in airplane mode or a similar mode that may lead to the devices radio being powered down, which may be triggered by one or more of malfunctioning hardware or a fault in an application running on the wireless communication device. The instruction to terminate the active communication session may also result from, for example, an instruction to power off the wireless communication device, which may also be triggered by malfunctioning hardware and/or a bug in an application running on the wireless communication device. The instruction to terminate the active communication session may also include a call end instruction, which may be intentionally or unintentionally triggered by user activity (e.g., accidentally hitting a call end button), or by a hardware or software fault.

In operation 318, the RIL 352 may send to the modem 354 a call end message. In operation 320, the modem 354 may send to the communication network 356 a call end message. In operation 322, the controller node of the communication network may terminate the active emergency communication session, which may include tearing down resources allocated within the communication network for the emergency communication session. In operation 324, the HLOS may send a radio off message to the RIL. In operation 326, the RIL may send to the modem and instruction to power off the radio, or to enter a low-power mode. In operation 328, the modem may send a message to the communication network to de-register the wireless communication device from the communication network.

Figure 4:
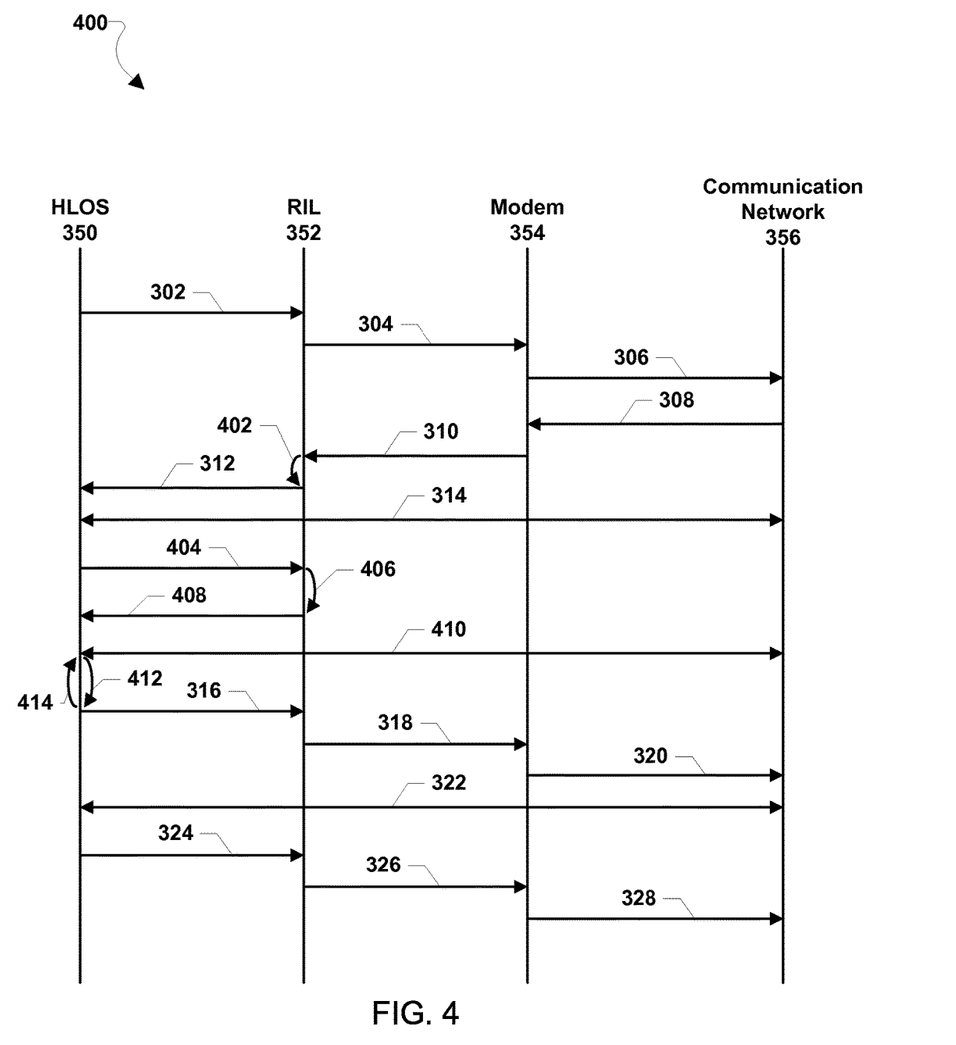
FIG. 4 is a call flow diagram illustrating an embodiment method of managing termination of an active communication session in a wireless communication device.

FIG. 4 illustrates call flows 400 in an embodiment method of managing termination of an active communication session in a wireless communication device. Many of the operations in FIG. 4 are similar to the like numbered operations described above with reference to FIG. 3. In operation 302, an HLOS 350 may send to a RIL 352 an instruction to initiate an emergency communication session. In operation 304, the RIL 352 may send to a modem 354 of the wireless communication device an instruction to initiate emergency communication session, and in operation 306, the modem 354 may send to a communication network 356 a call request to establish the emergency communication session. A network element of the communication network 356, such as a controller node (e.g., the controller node 112 of FIG. 1) may allocate resources for and establish a communication session with a provider of emergency services (e.g., the PSAP 114 of FIG. 1). In operation 308, the communication network 356 may send to the modem 354 an indication that the communication session setup was successful. In operation 310, the modem 354 may send to the RIL 352 an indication that the communication session set up was successful.

In operation 402, a processor of the wireless communication device (for example, a processor executing the RIL 352) may store in a memory of the wireless communication device an emergency communication status, such as a value or flag set in a control registered monitored by an operating system. The emergency communication status may indicate that the communication session is an emergency communication session. In some embodiments, the processor may determine that the communication session is an emergency communication session based on a variety of criteria or conductions. For example, the processor may determine that the communication session is an emergency communication session based on the destination of the communication session (e.g., a PSAP such as the PSAP 114 of FIG. 1). In some embodiments, the processor may determine that the communication session is an emergency communication session based on a dialed number or a portion of a dialed number. For example, a typical wireless priority service (WPS) call may include a prefix of "272." The processor may recognize the prefix "272" as a wireless priority service call, and may thus determine that the communication session is an emergency vacation session. Similarly, a call to emergency services in the U.S. may be made with the number "911", which the processor may recognize is a call to emergency services, and thus may determine that the communication session is an emergency communication session.

The processor may also determine that the communication session is an emergency communication session based on an input received by the wireless communication device from a user. For example, when initiating an outgoing communication session (e.g., a voice call), a user may press one or more physical or virtual buttons to indicate that the communication session is an emergency vacation session.

The processor may also determine the communication session is an emergency communication session based on rules provided to the wireless communication device. For example, a user may configure the wireless communication device with a rule stating that a call placed to a specified contact (i.e., a phone number stored in a memory of the wireless communication device) after a certain time of day shall be considered an emergency communication session (for example, a phone call placed to the user's parents after midnight). As another example, the user may configure the wireless communication device with a rule stating that a call placed to a phone number of the user's office during business hours, Monday through Friday, shall be considered an emergency communication session. Other rules are also possible.

As another example, a communication session conducted with a contact stored on the wireless communication device that is designated as important, e.g., in a memory of the wireless communication device, and the processor of the wireless communication device may determine that the communication session meets the threshold level of importance based on the designation of the stored contact as important.

In some embodiments, the processor may determine that the communication session meets a threshold level of importance, and thus the communication session is an emergency communication session. The processor may determine the threshold level of importance based on, for example, one or more of a phone number or portion of a phone number dialed to initiate the communication session, whether a portion of the dialed phone number matches a contact stored on the wireless communication device, and whether the wireless communication device has received an input from a user designating the communication session is an important communication session. The processor may also consider other factors to determine threshold level of importance.

In operation 312, the RIL 352 may send to the HLOS 350 an indication that the communication setup was successful. In operation 314, the wireless communication device may conduct the emergency communication session via the communication network 356.

In operation 404, the HLOS may send to the RIL an instruction to terminate the active emergency communication session. For example, the instruction to terminate the active communication session may result from the wireless communication device being placed in airplane mode or a similar mode that may lead to the devices radio being powered down, which may be triggered by one or more of malfunctioning hardware or a fault in an application running on the wireless communication device. As another example, the instruction to terminate the active communication session may also result from an instruction to power off the wireless communication device, which may also be triggered by malfunctioning hardware and/or a bug in an application running on the wireless communication device. The instruction to terminate the active communication session may also include a call end instruction, which may be intentionally or unintentionally triggered by user activity (e.g., accidentally hitting a call end button), or by a hardware or software fault.

In operation 406, the processor of the wireless communication session may determine that the emergency communication status of the wireless communication device indicates that the communication session should not be terminated. In operation 408, the RIL may return an indication to the HLOS that the communication session may be terminated, based on the emergency communication status. In operation 410, the wireless communication device may continue to conduct the emergency communication session.

In operation 412, the processor of the wireless communication device may periodically check to determine whether the emergency communication session has ended. In response to determining that the emergency communication session has not ended, in operation 412 the wireless communication device may continue to conduct the emergency communication session.

After the emergency communication session has ended, the HLOS may send to the RIL an instruction to terminate the active emergency communication session in operation 316. In operation 318, the RIL 352 may send to the modem 354 a call end message. In operation 320, the modem 354 may send to the communication network 356 a call end message. In operation 322, the controller node of the communication network may terminate the active emergency communication session, which may include tearing down resources allocated within the communication network for the emergency communication session. In operation 324, the HLOS may send a radio off message to the RIL. In operation 326, the RIL may send to the modem and instruction to power off the radio, or to enter a low-power mode. In operation 328, the modem may send a message to the communication network to de-register the wireless communication device from the communication network.

Figure 5:
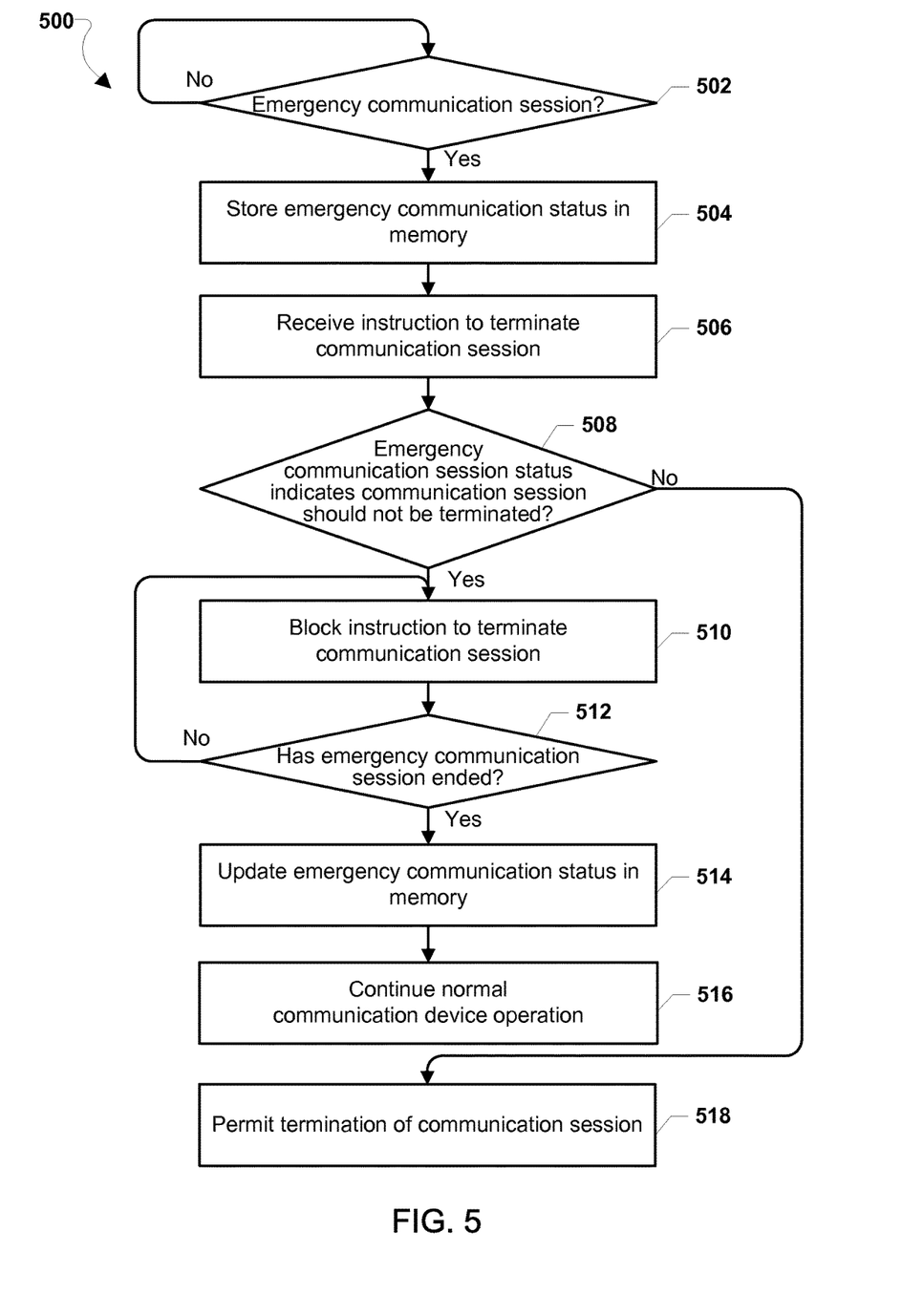
FIG. 5 is a process flow diagram illustrating an embodiment method of managing termination of an active communication session in a wireless communication device.

FIG. 5 is a process flow diagram illustrating an embodiment method 500 of managing termination of an active communication session in a wireless communication device. The method 500 may be implemented by a processor of a wireless communication device (e.g., the general processor 206 or the baseband processor 216 of FIG. 2, or by another similar processor).

In determination block 502, a processor of a wireless communication device may determine whether an active (or requested) communication session is an emergency communication session. In response to determining that the communication session is not an emergency communication session (i.e., determination block 502="No"), the processor of the wireless communication device may periodically re-determine whether a communication session is an emergency communication session.

In response to determining that the communication session is an emergency communication session (i.e., determination block 502="Yes"), in block 504, the device processor may store an emergency communication status in a memory of the wireless communication device. In various embodiments, the emergency communication status may indicate that the communication session includes an emergency communication session.

In some embodiments, the operations in determination block 502 and in block 504 may be performed by the processor as a separate method or functionality that sets an emergency communication status in a memory when an emergency communication session is initiated and clears the status when the emergency communication session ends.

At any time (i.e., not necessarily after block 504), the device processor may receive an instruction to terminate the communication session in block 506. For example, an HLOS (e.g., the HLOS 350 of FIGS. 3 and 4) may send to a RIL (e.g., the RIL 352 of FIGS. 3 and 4) an instruction to terminate the active communication session. As noted above, the instruction to terminate the active communication session may unintentionally result from, for example, the wireless communication device being placed in airplane mode or a similar mode that may lead to the devices radio being powered down, or from, for example, an instruction to power off the wireless communication device, which may also be triggered by malfunctioning hardware and/or a bug in an application running on the wireless communication device. The instruction to terminate the active communication session may also include a call end instruction, which may be intentionally or unintentionally triggered by user activity (e.g., accidentally hitting a call end button), or by a hardware or software fault.

In determination block 508, the device processor may determine whether the emergency communication status of the wireless communication device indicates that communication session should not be terminated. In response to determining that the emergency communication status does not indicate that the communication session should not be terminated (i.e., determination block 508="No"), the device processor may permit termination of the communication session in block 518.

In response to determining that the emergency communication status does indicate that the communication session should not be terminated (i.e., determination block 508="Yes"), the device processor may block the instruction to terminate the communication session in block 510.

In determination block 512, the device processor may periodically determine whether the emergency communication session has ended. In response to determining that the emergency communication session has not ended (i.e., determination block 512="No"), the device processor may continue to block the instruction to terminate the communication session in block 510.

In response to determining that the emergency communication session has ended (i.e., determination block 512="Yes"), the device processor may update the emergency communication status in the memory of the wireless communication device in block 514. For example, the processor may update the emergency communication status to indicate that there is no active emergency communication session, or that another active call session is not an emergency call. In block 516, the device processor may permit or continue normal wireless communication device operation.

Figure 6:
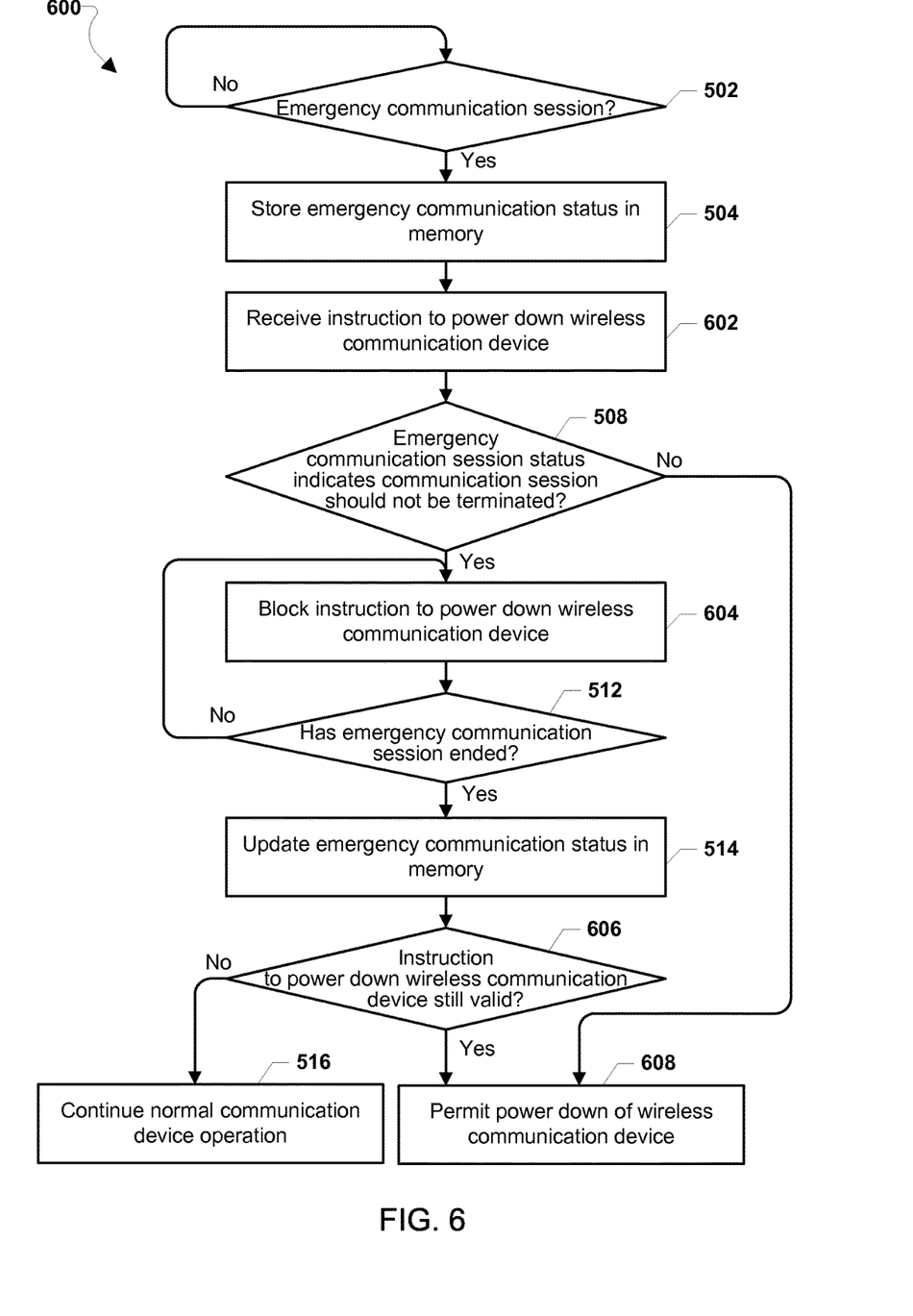
FIG. 6 is a process flow diagram illustrating another embodiment method of managing termination of an active communication session in a wireless communication device.

FIG. 6 is a process flow diagram illustrating an embodiment method 600 of managing termination of an active communication session in a wireless communication device. The method 600 may be implemented by a processor of a wireless communication device (e.g., the general processor 206 or the baseband processor 216 of FIG. 2, or by another similar processor).

Similar to the method 500, a processor of a wireless communication device may determine whether an active (or requested) communication session is an emergency communication session in determination block 502. In response to determining that the communication session is not an emergency communication session (i.e., determination block 502="No"), the processor of the wireless communication device may periodically re-determine whether a communication session is an emergency communication session. In response to determining that the communication session is an emergency communication session (i.e., determination block 502="Yes"), the device processor may store an emergency communication status in a memory of the wireless communication device. In various embodiments, the emergency communication status may indicate that the communication session includes an emergency communication session in block 504. As described above, the operations in determination block 502 and in block 504 may be performed by the processor as a separate method or functionality independent of other operations in the method 600.

At any time (i.e., not necessarily after block 504), the device processor may receive an instruction to power down the wireless communication device in block 602. The instruction to power down (or power off) the wireless communication device may unintentionally be triggered by malfunctioning hardware and/or a fault in an application running on the wireless communication device. The instruction to terminate the active communication session may also be unintentionally triggered by user activity (e.g., accidentally hitting a power off button).

In determination block 508, the device processor may determine whether the emergency communication status of the wireless communication device indicates that communication session should not be terminated. In response to determining that the emergency communication status does not indicate that the communication session should not be terminated (i.e., determination block 508="No"), the device processor may permit the power down of the wireless communication device in block 608.

In response to determining that the emergency communication status does indicate that the communication session should not be terminated (i.e., determination block 508="Yes"), the device processor may block the instruction to power down the wireless communication device in block 604.

In determination block 512, the device processor may periodically determine whether the emergency communication session has ended. In response to determining that the emergency communication session has not ended (i.e., determination block 512="No"), the device processor may continue to block the instruction to terminate the communication session in block 510.

In response to determining that the emergency communication session has ended (i.e., determination block 512="Yes"), the device processor may update the emergency communication status in the memory of the wireless communication device in block 514. For example, the processor may update the emergency communication status to indicate that there is no active emergency communication session, or that another active call session is not an emergency call.

In determination block 606, the device processor may determine whether the instruction to power down the wireless communication device is still valid. For example, in the case where the instruction to power down the wireless device is received from faulty hardware or software, the instruction may be transient, or the device processor may determine by another indication that the instruction to power down the wireless device is not valid. In response to determining that the instruction to power down the wireless connection device is not still valid (i.e., determination block 606="No"), the device processor may permit or continue normal wireless communication device operation in block 516.

In response to determining that the instruction to power down the wireless connection device is still valid (i.e., determination block 606="Yes"), the device processor may permit the power down of the wireless communication device in block 608 (i.e., the device processor may not block the still-valid instruction to power down the wireless communication device).

Figure 7:
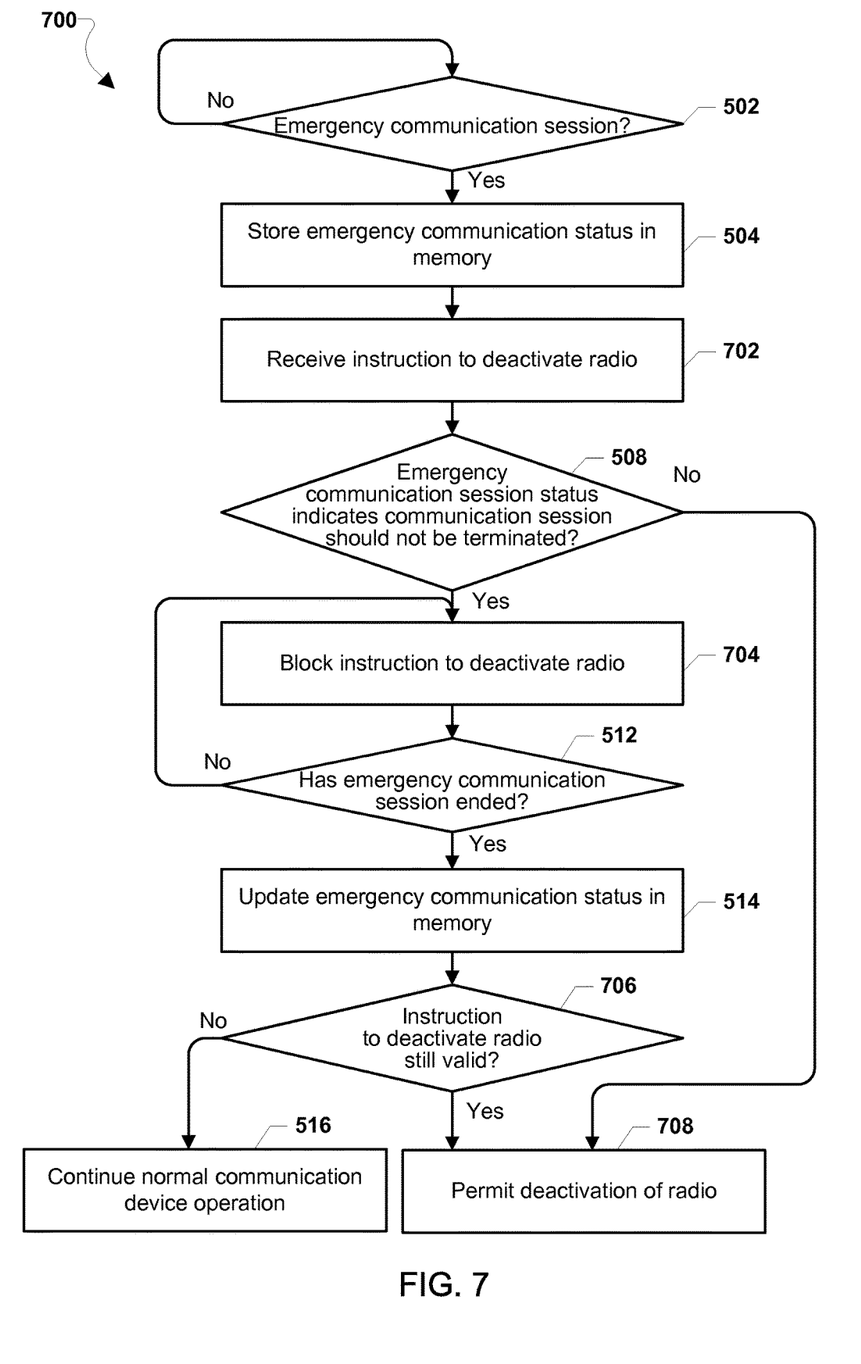
FIG. 7 is a process flow diagram illustrating another embodiment method of managing termination of an active communication session in a wireless communication device.

FIG. 7 is a process flow diagram illustrating an embodiment method 700 of managing termination of an active communication session in a wireless communication device. The method 700 may be implemented by a processor of a wireless communication device (e.g., the general processor 206 or the baseband processor 216 of FIG. 2, or by another similar processor).

Similar to the method 500, a processor of a wireless communication device may determine whether an active (or requested) communication session is an emergency communication session in determination block 502. In response to determining that the communication session is not an emergency communication session (i.e., determination block 502="No"), the processor of the wireless communication device may periodically re-determine whether a communication session is an emergency communication session. In response to determining that the communication session is an emergency communication session (i.e., determination block 502="Yes"), the device processor may store an emergency communication status in a memory of the wireless communication device in block 504. In various embodiments, the emergency communication status may indicate that the communication session includes an emergency communication session. As described above, the operations in determination block 502 and in block 504 may be performed by the processor as a separate method or functionality independent of other operations in the method 600.

At any time (i.e., not necessarily after block 504), the device processor may receive an instruction to deactivate a radio of the wireless communication device in block 702. The instruction to deactivate the radio (i.e., power down, power off, set to an idle mode, or similarly block the radio from transmitting) may be triggered unintentionally by malfunctioning hardware and/or a fault in an application running on the wireless communication device. The instruction to terminate the active communication session may also be unintentionally triggered by user activity (e.g., placing the wireless device in an airplane mode or otherwise triggering an instruction to deactivate the radio of the wireless communication device).

In determination block 508, the device processor may determine whether the emergency communication status of the wireless communication device indicates that the communication session should not be terminated. In response to determining that the emergency communication status does not indicate that the communication session should not be terminated (i.e., determination block 508="No"), the device processor may permit the power down of the wireless communication device in block 608.

In response to determining that the emergency communication status does indicate that the communication session should not be terminated (i.e., determination block 508="Yes"), the device processor may block the instruction to deactivate the radio of the wireless communication device in block 704.

In determination block 512, the device processor may periodically determine whether the emergency communication session has ended. In response to determining that the emergency communication session has not ended (i.e., determination block 512="No"), the device processor may continue to block the instruction to terminate the communication session in block 510.

In response to determining that the emergency communication session has ended (i.e., determination block 512="Yes"), the device processor may update the emergency communication status in the memory of the wireless communication device in block 514. For example, the processor may update the emergency communication status to indicate that there is no active emergency communication session, or that another active call session is not an emergency call.

In determination block 706, the device processor may determine whether the instruction to deactivate the radio of the wireless communication device is still valid. For example, in the case where the instruction to power down the wireless device is received from faulty hardware or software, the instruction may be transient, or the device processor may determine by another indication that the instruction to power down the wireless device is not valid. However, in some cases the instruction to deactivate the radio of the wireless communication device may still be valid, such as when a user in fact desires to place the wireless communication device in an airplane mode. In response to determining that the instruction to deactivate the radio of the wireless connection device is not still valid (i.e., determination block 706="No"), the device processor may permit or continue normal wireless communication device operations in block 516.

In response to determining that the instruction to deactivate the radio of the wireless connection device is still valid (i.e., determination block 706="Yes"), the device processor may permit the deactivation of the radio of the wireless communication device in block 708 (i.e., the device processor may not block the still-valid instruction to deactivate the radio of the wireless communication device).

Various embodiments (including, but not limited to, embodiments discussed above with reference to FIGS. 4-7) may be implemented in any of a variety of mobile communication devices, an example of which (e.g., wireless communication device 800) is illustrated in FIG. 7. In various embodiments, the wireless communication device 800 (which may correspond, for example, to the wireless communication devices 102, 104, and 200 in FIGS. 1-2) may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile communication device 800 need not have touch screen capability.

Figure 8:
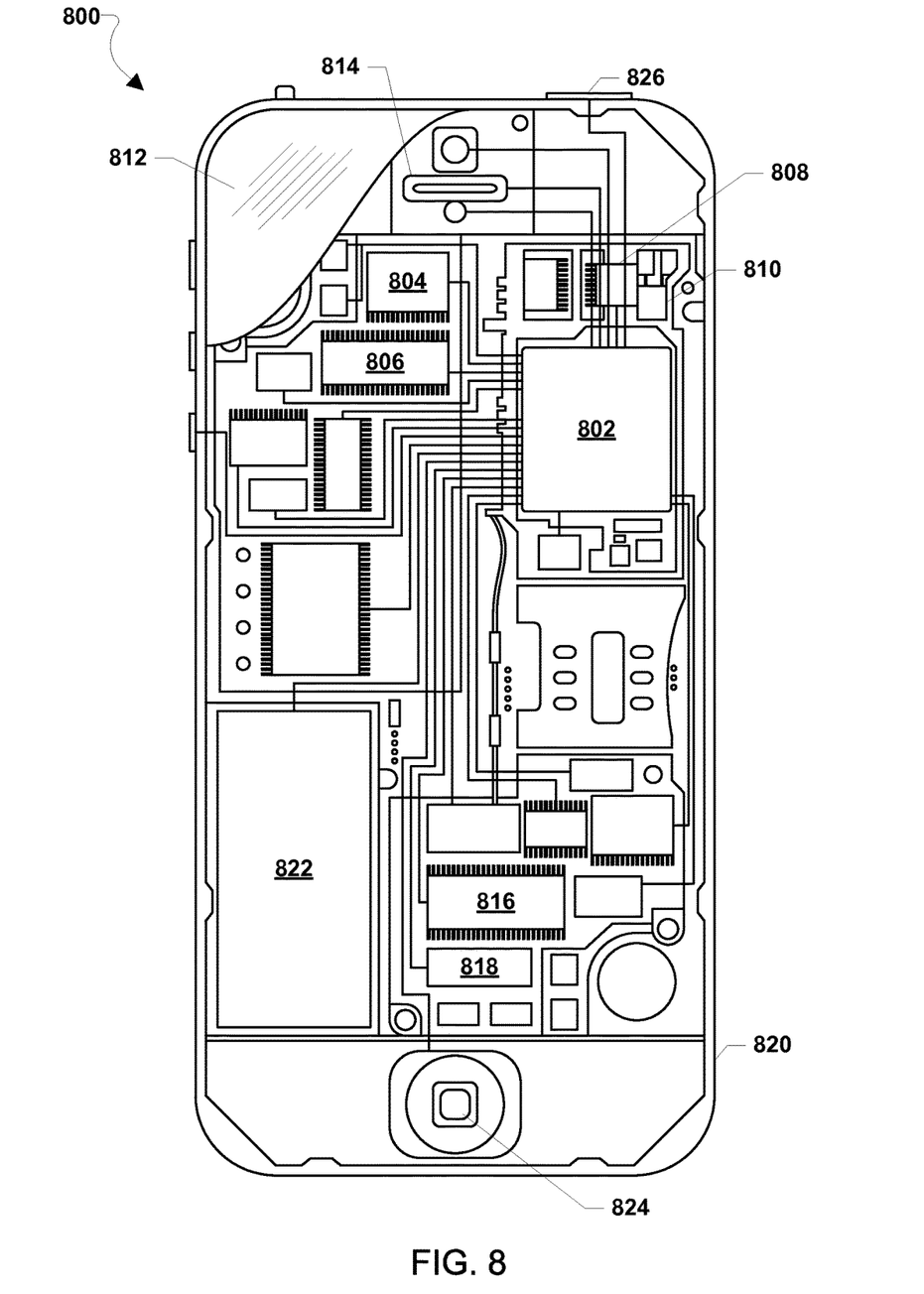
FIG. 8 is a component block diagram of an example mobile device suitable for use with the various embodiments.

The mobile communication device 800 may have two or more radio signal transceivers 808 (e.g., Peanut, Bluetooth, Zigbee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile communication device 800 may include one or more cellular network wireless modem chip(s) 816 coupled to the processor and antennae 810 that enables communication via two or more cellular networks via two or more radio access technologies.

The mobile communication device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The mobile communication device 800 may also include speakers 814 for providing audio outputs. The mobile communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to the peripheral device connection port to receive a charging current from a source external to the wireless communication device 800. The wireless communication device 800 may also include a physical button 824 for receiving user inputs. The wireless communication device 800 may also include a power button 826 for turning the wireless communication device 800 on and off.

The processor 802 may be any programmable microprocessor, microcomputer or multiple processor chip or chips that can be configured by software instructions (applications) to perform a variety of functions, including the functions of various embodiments described below. In some wireless communication devices, multiple processors 802 may be provided, such as one processor dedicated to wireless communication functions and one processor dedicated to running other applications. Typically, software applications may be stored in the internal memory 806 before they are accessed and loaded into the processor 802. The processor 802 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, the various embodiments are not intended to be limited to the embodiments shown herein but are to be accorded the widest scope consistent with the following claims and the principles and novel features disclosed herein.

What is claimed is:

1. A method of managing termination of an active communication session in a wireless communication device, comprising:
    determining, by a processor of the wireless communication device, whether a communication session in progress is an emergency communication session;
    storing, in a memory of the wireless communication device, an indicator comprising an emergency communication status indicating that the communication session should not be terminated in response to determining that the communication session is an emergency communication session;
    receiving, by the processor, an instruction that causes a termination of the communication session;
    determining, by the processor, whether the communication session in progress should not be terminated based on the stored indicator;
    blocking, by the processor, the instruction to terminate the communication session in response to determining that the communication session should not be terminated;
    updating the emergency communication status in response to determining that there is no active emergency communication session;
    determining, by the processor, whether the instruction to terminate the communication session is still valid;
    continuing, by the processor, normal operations of the wireless communication device in response to determining that the instruction to terminate the communication session is not still valid; and
    permitting, by the processor, the instruction to terminate the communication session in response to determining that the instruction to terminate the communication session is still valid.

2. The method of claim 1, further comprising:
    determining, by the processor, that the communication session has ended; and
    updating, by the processor, the emergency communication status in the memory.

3. The method of claim 1, further comprising permitting the instruction to terminate the communication session in response to determining that the emergency communication status of the wireless device indicates that the communication session may be terminated.

4. The method of claim 1, wherein the instruction to terminate the communication session comprises an instruction to power down the wireless communication device.

5. The method of claim 1, wherein blocking, by the processor, the instruction to terminate the communication session comprises blocking the instruction to power down the wireless communication device.

6. The method of claim 5, further comprising:
    updating, by the processor, the emergency communication status in the memory in response to the communication session ending;
    and
    wherein permitting, by the processor, the instruction to terminate the communication session comprises permitting the instruction to power down the wireless communication device.

7. The method of claim 1, wherein the instruction to terminate the communication session comprises an instruction to deactivate a radio of the wireless communication device.

8. The method of claim 7, wherein blocking, by the processor, the instruction to terminate the communication session comprises blocking the instruction to deactivate the radio of the wireless communication device.

9. The method of claim 8, further comprising:
    updating, by the processor, the emergency communication status in the memory in response to the communication session ending;
    and
    wherein permitting, by the processor, the instruction to terminate the communication session comprises permitting the instruction to deactivate the radio of the wireless communication device.

10. A wireless communication device, comprising:
    a processor configured with processor-executable instructions to perform operations comprising:
        determining whether an emergency communication session is in progress;
        storing, in a memory of the wireless communication device, an indicator comprising an emergency communication status indicating that the emergency communication session should not be terminated in response to determining that an emergency communication session is in progress;

receiving an instruction that causes a termination of the communication session;

determining whether the communication session in progress should not be terminated based on the stored indicator;

blocking the instruction to terminate the communication session in response to determining that the communication session should not be terminated;

updating the emergency communication status in response to determining that there is no active emergency communication session;

determining whether the instruction to terminate the communication session is still valid;

continuing normal operations of the wireless communication device in response to determining that the instruction to terminate the communication session is not still valid; and permitting the instruction to terminate the communication session in response to determining that the instruction to terminate the communication session is still valid.

11. The wireless communication device of claim 10, wherein the processor is configured with processor-executable instructions to perform operations further comprising:

determining that the communication session has ended; and updating the emergency communication status in the memory.

12. The wireless communication device of claim 10, wherein the processor is configured with processor-executable instructions to perform operations further comprising permitting the instruction to terminate the communication session in response to determining that the emergency communication status of the wireless device indicates that the communication session may be terminated.

13. The wireless communication device of claim 10, wherein the processor is configured with processor-executable instructions to perform operations such that the instruction to terminate the communication session comprises an instruction to power down the wireless communication device.

14. The wireless communication device of claim 10, wherein the processor is configured with processor-executable instructions to perform operations such that blocking the instruction to terminate the communication session comprises blocking the instruction to power down the wireless communication device.

15. The wireless communication device of claim 14, the processor is configured with processor-executable instructions to perform operations further comprising:

updating the emergency communication status in the memory in response to the communication session ending; and wherein permitting the instruction to terminate the communication session comprises permitting the instruction to power down the wireless communication device.

16. The wireless communication device of claim 10, wherein the processor is configured with processor-executable instructions to perform operations such that the instruction to terminate the communication session comprises an instruction to deactivate a radio of the wireless communication device.

17. The wireless communication device of claim 16, wherein the processor is configured with processor-executable instructions to perform operations such that blocking the instruction to terminate the communication session comprises blocking the instruction to deactivate the radio of the wireless communication device.

18. The wireless communication device of claim 17, wherein the processor is configured with processor-executable instructions to perform operations further comprising:

updating the emergency communication status in the memory in response to the communication session ending; and wherein permitting the instruction to terminate the communication session comprises permitting the instruction to deactivate the radio of the wireless communication device.

19. A non-transitory processor-readable storage medium having stored thereon processor-executable software instructions configured to cause a processor to perform operations for managing termination of an active communication session in a wireless communication device, comprising:

determining whether a communication session in progress is an emergency communication session;

storing, in a memory of the wireless communication device, an indicator comprising an emergency communication status indicating that the communication session should not be terminated in response to determining that the communication session is an emergency communication session;

receiving an instruction that causes a termination of the communication session;

determining whether the communication session in progress should not be terminated based on the stored indicator;

blocking the instruction to terminate the communication session in response to determining that the communication session should not be terminated;

updating the emergency communication status in response to determining that there is no active emergency communication session;

determining, by the processor, whether the instruction to terminate the communication session is still valid;

continuing, by the processor, normal operations of the wireless communication device in response to determining that the instruction to terminate the communication session is not still valid; and permitting, by the processor, the instruction to terminate the communication session in response to determining that the instruction to terminate the communication session is still valid.

20. The non-transitory processor-readable storage medium of claim 19, wherein the stored processor-executable software instructions are configured to cause a processor to perform operations further comprising:

determining that the communication session has ended; and updating the emergency communication status in the memory.

21. The non-transitory processor-readable storage medium of claim 19, wherein the stored processor-executable software instructions are configured to cause a processor to perform operations further comprising permitting the instruction to terminate the communication session in response to determining that the emergency communication status of the wireless device indicates that the communication session may be terminated.

22. The non-transitory processor-readable storage medium of claim 19, wherein the stored processor-executable software instructions are configured to cause a processor to perform operations such that the instruction to terminate the communication session comprises an instruction to power down the wireless communication device.

23. The non-transitory processor-readable storage medium of claim 19, wherein the processor is configured with processor-executable instructions to perform operations such that blocking the instruction to terminate the communication session comprises blocking the instruction to power down the wireless communication device.

24. The non-transitory processor-readable storage medium of claim 23, wherein the processor is configured with processor-executable instructions to perform operations further comprising:
    updating the emergency communication status in the memory in response to the communication session ending;
    and
wherein permitting the instruction to terminate the communication session comprises permitting the instruction to power down the wireless communication device.

25. The non-transitory processor-readable storage medium of claim 19, wherein the processor is configured with processor-executable instructions to perform operations such that the instruction to terminate the communication session comprises an instruction to deactivate a radio of the wireless communication device.

26. The non-transitory processor-readable storage medium of claim 25, wherein the processor is configured with processor-executable instructions to perform operations such that blocking the instruction to terminate the communication session comprises blocking the instruction to deactivate the radio of the wireless communication device.

27. A wireless communication device, comprising:
    means for determining whether a communication session in progress is an emergency communication session;
    means for storing an indicator comprising an emergency communication status indicating that the communication session should not be terminated in response to determining that the communication session is an emergency communication session;
    means for receiving an instruction that causes a termination of the communication session;
    means for determining whether the communication session in progress should not be terminated based on the stored indicator;
    means for blocking the instruction to terminate the communication session in response to determining that the communication session should not be terminated;
    means for updating the emergency communication status in response to determining that there is no active emergency communication session;
    means for determining whether the instruction to terminate the communication session is still valid;
    means for continuing normal operations of the wireless communication device in response to determining that the instruction to terminate the communication session is not still valid; and
means for permitting the instruction to terminate the communication session in response to determining that the instruction to terminate the communication session is still valid.

* * * * *